United States Patent [19] [11] 4,059,217
Woodward [45] Nov. 22, 1977

[54] SUPERALLOY LIQUID INTERFACE DIFFUSION BONDING

[75] Inventor: James R. Woodward, La Jolla, Calif.

[73] Assignee: Rohr Industries, Incorporated, Chula Vista, Calif.

[21] Appl. No.: 645,381

[22] Filed: Dec. 30, 1975

[51] Int. Cl.² ............................................. B23K 19/00
[52] U.S. Cl. .................................. 228/181; 228/194; 228/209; 228/263
[58] Field of Search ....................... 228/187, 193–195, 228/208–209, 263, 181; 29/194

[56] References Cited

U.S. PATENT DOCUMENTS

| 3,234,031 | 2/1966 | Zirngiebl et al. | 427/430 A |
| 3,530,568 | 9/1970 | Owczarski et al. | 29/498 |
| 3,675,311 | 7/1972 | Wells | 228/194 |
| 3,678,570 | 7/1972 | Paulonis et al. | 29/498 |
| 3,723,078 | 3/1973 | Parker | 29/194 |
| 3,769,101 | 10/1973 | Woodward | 228/195 X |

Primary Examiner—Donald G. Kelly
Assistant Examiner—K. J. Ramsey
Attorney, Agent, or Firm—Patrick J. Schlesinger; Frank D. Gilliam

[57] ABSTRACT

A liquid interface diffusion process is provided where a thin deposit (from ½ to 4 mils) of nickel (and/or cobalt) having 4-12 weight percent boron is plated on the nickel or cobalt based alloy faying surfaces. In the case of honeycomb sandwich, the plating is applied to the edge of the core or on the facing sheets and the assembly held together in intimate contact and exposed to a temperature sufficient to cause the Ni-B eutectic to melt. At the eutectic temperature a liquid is formed which makes a metallurgical joint. Upon further time at temperature the boron is diffused into the substrate so that isothermal solidification occurs and the boron is diluted to a small concentration. Sufficient time is allowed (on the order of one or more hours) so that the melting point at the joint area is essentially the same as the substrate and the joint is comparable to a diffusion bond.

In the case of solid sections the Ni(Co), 4-12% B plating is deposited on one faying surface or ½ the amount on both faying surfaces and exposed to the same conditions as described above.

38 Claims, No Drawings

SUPERALLOY LIQUID INTERFACE DIFFUSION BONDING

BACKGROUND OF THE INVENTION

Light weight high-strength structures are important for aircraft application in hot areas where nickel and cobalt base superalloys are applied. One of the most efficient structures which meets the high strength to weight ratio criteria, along with acoustical dampening, is honeycomb sandwich where a light weight core, made from superalloy foil resistance welded in a honeycomb pattern, is joined to faces made from superalloy sheet. In some cases one of the faces is perforated to allow the structure to act not only as a structural member but also as a sound attenuator. This type of structure is prevalent in nacelles, ducting and tailpipes on aircraft and jet engines. In such applications temperatures over 1000° F are experienced, requiring superalloy construction. Superalloys for this discussion are those alloys based on nickel or cobalt with or without the gamma prime hardening mechanism (i.e., Inconel, Waspalloy, Rene' 41, Hastelloy, Hayne 25, etc.). Brazing has been used in the past to join such structures. However, because of the thin foil used as core, the corrosion resistant aggressive type nickel base braze alloys, containing relatively high percentages of boron and silicon, cause corrosion of the foil and are difficult to employ in production. These braze alloys are characterized in AMS 4775, 76, 77 and 78 specifications. Therefore, such structures are normally fabricated employing less aggressive braze alloys containing high percentages of manganese which limits the temperature range of the structures because of lower strength and corrosion resistance.

Eutectic systems with nickel have been known for many years. There are three basic systems which have been commonly used to obtain nickel based braze alloys with a practical melting temperature; phosphorus, silicon and boron:

| | | |
|---|---|---|
| phosphorus | 11% | — 1616° F |
| silicon | 11.5% | — 2106° F |
| boron | 4% | — 1969 to 2054° F (depending upon investigator) |

Phosphorus is not commonly used as a braze alloy element on superalloys because of high temperature metallurgical problems; therefore silicon, boron, or both, are used primarily to lower the melting point of nickel. Boron is the most aggressive as inferred by the small weight percentage required to obtain a 1969° F eutectic compared with nearly three times as much silicon for a higher eutectic point. Eutectic systems with cobalt based alloys are similar to nickel:

| | | |
|---|---|---|
| Co—P | 11.5% | — 1873° F |
| Co—Si | 12.5% | — 2183° F |
| Co—B | 5.5% | — 1985° F |

Manganese is also used to lower the nickel melting temperature, it being less aggressive than the above eutectic systems. Nickel-manganese forms a minimum (it is not a eutectic) at 1864° F with 60.5 weight percent manganese. Additions of copper with the manganese, employing the minimum reaction of 38.5 Mn — 61.5 Cu at 1568° F, and also silicon are used to alloy less aggressive braze alloys for honeycomb sandwich structures (i.e., Ni, 22.5 Mn, 7 Si, 5 Cu is a common braze alloy).

From those elements which can be used to lower the melting point of nickel and for cobalt, boron is the most desirable in terms of the smallest quantity for the most melting point depression. Its effect upon the functioning of superalloys is also minimal.

OBJECTS OF THE INVENTION

An object of the invention is to provide a joining system which will allow superalloy honeycomb sandwich structures to be unlimited in temperature application relative to the joining material. Such a structure would be limited only by the base materials used.

A further object of the invention is to apply the above joining system to solid sections and applications other than joining honeycomb core to facing sheets with the same benefits.

A still further object of the invention is to provide a method for joining nickel and/or cobalt based alloys by coating the faying surfaces with nickel and/or cobalt having 4 to 12 weight percent boron and heating for sufficient time at sufficient temperature to form a metallurgical joint and diffuse substantially all of the boron away from the joint.

The above and still further objects of the invention will immediately become apparent to those skilled in the art after consideration of the following preferred embodiments thereof, which are provided by way of example and not by way of limitation.

SUMMARY OF THE INVENTION

A liquid interface diffusion process is provided where a thin deposit (from ½ to 4 mils) of nickel (and/or cobalt) has 4–12 weight percent boron plated on the nickel or cobalt based alloy faying surfaces. In the case of honeycomb sandwich, the plating is applied to the edges of the core or on the facing sheets and the assembly held together in intimate contact and exposed to a temperature sufficient to cause the eutectic to melt. At the eutectic temperature a liquid is formed which makes a metallurgical joint. Upon further time at temperature the boron is diffused into the substrate so that isothermal solidification occurs and the boron is diluted to a small concentration. Sufficient time is allowed (on the order of one or more hours) so that the melting point at the joint area is essentially the same as the substrate and the joint is comparable to a diffusion bond.

In the case of solid sections of Ni(Co), 4–12% B plating is deposited on one faying surface or one-half the amount on both faying surfaces and exposed to the same conditions as described above.

DESCRIPTION OF THE INVENTION

There are several joining processes for superalloys which employ either thin film or boron eutectic containing interleafs. The thin film art is characterized by patent of Wells U.S. Pat. No. (3,675,311) where coatings of Ti, Cb, Ag and Au are used at the interface. Similar art is shown by the patent to Paulonis et al. U.S. Pat. No. (3,678,570) where a boron containing (5%) interleaf is used between the faying surfaces. Although based upon similar scientific facts (i.e., constitution diagrams), as is nearly all metallurgical art, this invention is much different and simpler. A key feature of the invention is the plating system where an alloy (or mixture) of nickel (and/or cobalt) and boron is applied by an electroless plating process. By adjusting the bath conditions the boron percentage can be raised above 4 weight percent giving the conditions for the eutectic reaction. By simple immersion, a deposit of Ni(Co)-B can be applied directly to the faying surface. By adjusting the thickness of the deposit, the eutectic liquid can be reliably obtained under nearly any condition of the temperature cycle used in joining. Even very slow heating rates (2° F/min) with deposits 1 mil thick will produce a eutectic liquid at approximately 2000° F.

In diffusion bonding it is usual for the pressures, holding the joint together during the thermal cycle, to be above the yield strength of the substrate. By using the electroless plating system, only contact pressures are required because the liquid interface has mobility to fill the macro and micro voids present at the close fitting faying areas. This feature is important when considering honeycomb sandwich joining where pressures must be relatively low (<15 psi normally) to prevent crushing the low density core material.

Diluting the boron in the joint by diffusion requires time and temperature. The diffusion temperature is made to correspond to the solution annealing temperature of the alloy, normally being in the 1950° to 2150° F range. I have found that times of over one hour are satisfactory for honeycomb sandwich structures; however, the longer the time, the more dilution occurs through atomic transfer and the metallurgical condition of the joint closer resembles a diffusion bond. The time at temperature for diffusion is considered influenced by economic factors because it requires energy and furnace time, both of which bear upon the cost of the end product. A 2 to 5 hour diffusion time has been found to be satisfactory, knowing that longer times may be beneficial.

In exercising my invention, a vacuum environment in the $10^{-5}$ to $10^{-6}$ Torr range has been used for the thermal processing because of the better protection of the materials. An argon atmosphere is also satisfactory and atmospheres such as hydrogen and helium would be equally satisfactory.

There are several patents regarding the electroless plating of Ni(Co)-B which can be used in this invention, examples being Hoke, U.S. Pat. No. 2,990,296; Berzins, U.S. Pat. No. 3,045,334, 3,096,182, 3,338,726; Zirugiebl, U.S. Pat. No. 3,234,031 and McLeod, U.S. Pat. No. 3,062,666. The plating solution forms no part of my invention, it merely being necessary that the plating solution and system be capable of depositing Ni and/or Co with 4–12 weight percent boron, preferably by electroless techniques.

As an example of performing a bonding operation in accordance with the present invention, the nickel or cobalt based alloy elements, composed of two facing sheets and a honeycomb core for purpose of discussion, are cleaned and the core masked with a suitable maskant which is inert relative to the plating bath to be used, the maskant being omitted from the faying surfaces of the elements. This is accomplished by applying maskant to the entire honeycomb core to be bonded and then removing the maskant from the faying surfaces by abrading the maskant from the core edges. An alternative of plating the facing sheets involves masking one side of each sheet. The faying surfaces are then dust blasted to increase adherence of the plating deposit and the faying surfaces are then plated by electroless plating techniques in an appropriate plating solution to provide a deposit of nickel and/or cobalt having 4 to 12 weight percent of boron therein.

After plating, the maskant is removed with an appropriate solvent, the faying surfaces of the elements to be bonded are assembled and heated in the range of 1900° to 2100° F for about 2 hours in a vacuum of about $10^{-5}$ to $10^{-6}$ Torr. Alternately, an argon, hydrogen or helium atmosphere can be used. The heating time should be more than 1 hour, the longer the better for greater diffusion of the boron from the joint. The bonded elements are then cooled.

As an example Inconel 625 (a Ni, 22Cr, 9 Mo, 4 Cb, 3 Fe, 0.3 Si, 0.2 Ti, 0.2 Al, 0.15 Mn, .05 C superalloy) honeycomb core made with both 0.0025 and 0.003 inch thick foil in both ⅛ and ⅜ inch cell sizes, have been masked with Microshield (a common chemical maskant) over the entire core, and then the maskant sanded from the core edges (which are the faying surfaces), the edges then dust blasted to increase the adherence of the plating deposit and then the edges plated in the NIKLAD plating solution. NIKLAD is the brand name of an electroless Ni-B plating solution produced by the Allied-Kelite Division of the Richardson Co. It consists mainly of nickel sulphate as the nickel salt and the DMAB (Dimethylamine Borane) reducer, with complexing agents in water. The plating was deposited at a rate of from 0.2 to 0.4 mils per hour with the temperature of the solution at 160° F and the concentration of DMAB (Dimethylamine Borane; the reducer and the supplier of boron in the deposit) at 1 to 5 volume percent and the nickel salts at 30% volume percent in water adjusted to a 5 pH. A 6 volt D.C. starting current was applied for one minute to start plating uniformly on the core edges. The solution is agitated during the plating step.

After plating of the Ni-B deposit and removing the maskant with a solvent, the faces were assembled and heated to 2000° F in a vacuum as defined above and that temperature held for two hours. After cooling, the parts were tested by measuring the force required to pull the faces from the core (called flatwise tension) which applies stress to the core to face sheet joints. In nearly all tests the force required was that of the ultimate strength of the core material.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

Having thus described the invention, what is claimed as new and useful and desired to be secured by United States Letters Patent is:

1. A process for joining nickel and/or cobalt based on superalloys which comprises the steps of:
   a. providing and masking elements to be joined together, said elements being formed of material taken from the class consisting of nickel based and cobalt based alloys,
   b. simultaneously applying to the faying surface of at least one of said elements by plating directly thereon from a single chemical bath of a layer taken from the class consisting of nickel, cobalt and a combination thereof and from about 4 to about 12 weight percent boron,
   c. demasking said elements and holding the elements together at their faying surfaces with sufficient force to maintain contact at the faying surfaces, and d. heating the elements to a temperature in the range of 1950° to 2150° F for more than one hour to cause the deposit to melt and form a metallurgical joint.

2. A process as set forth in claim 1 wherein one of said elements is a honeycomb core.

3. A process as set forth in claim 2 wherein the applying in (b) is provided by electroless plating.

4. A process as set forth in claim 3 wherein said heating in step (d) is for a sufficient period whereby the melting temperature at the joint is substantially the same as the elements bonded together.

5. A process as set forth in claim 4 wherein step (d) is carried out in one of a substantial vacuum, helium, argon or hydrogen atmosphere.

6. A process according to claim 5 wherein the thickness of said deposit is from about ½ to about 4 mils.

7. A process as set forth in claim 5 wherein said deposit in (b) is on both of said elements.

8. A process according to claim 4 wherein the thickness of said deposit is from about ½ to about 4 mils.

9. The process of claim 4 wherein the temperature corresponds to the solution annealing temperature specified for the particular material.

10. The process of claim 3 wherein a small direct current is applied to the elements for a period up to five minutes, the elements being relatively negative electrically at the beginning of step (b).

11. A process as set forth in claim 10 wherein step (d) is carried out in one of a substantial vacuum, helium, argon or hydrogen atmosphere.

12. A process according to claim 11 wherein the thickness of said deposit is from about ½ to about 4 mils.

13. A process as set forth in claim 11 wherein said deposit in (b) is on both of said elements.

14. A process according to claim 10 wherein the thickness of said deposit is from about ½ to about 4 mils.

15. A process as set forth in claim 3 wherein step (d) is carried out in one of a substantial vacuum, helium, argon or hydrogen atmoshpere.

16. A process as set forth in claim 2 wherein said heating in step (d) is for a sufficient period whereby the melting temperature at the joint is substantially the same as the elements bonded together.

17. A process as set forth in claim 16 wherein step (d) is carried out in one of a substantial vacuum, helium, argon or hydrogen atmosphere.

18. The process of claim 16 wherein the temperature corresponds to the solution annealing temperature specified for the particular material.

19. A process as set forth in claim 2 wherein step (d) is carried out in one of a substantial vacuum, helium, argon or hydrogen atmosphere.

20. A process as set forth in claim 2 wherein said deposit is applied to the core edges.

21. A process as set forth in claim 1 wherein the applying in (b) is provided by electroless plating.

22. A process as set forth in claim 21 wherein said heating in step (d) is for a sufficient period whereby the melting temperature at the joint is substantially the same as the elements bonded together.

23. A process as set forth in claim 22 wherein step (d) is carried out in one of a substantial vacuum, helium, argon or hydrogen atmosphere.

24. A process according to claim 23 wherein the thickness of said deposit is from about ½ to about 4 mils.

25. A process as set forth in claim 23 wherein said deposit in (b) is on both of said elements.

26. A process according to claim 22 wherein the thickness of said deposit is from about ½ to about 4 mils.

27. The process of claim 22 wherein the temperature corresponds to the solution annealing temperature specified for the particular material.

28. The process of claim 21 wherein a small direct current is applied to the elements for a period up to five minutes, the elements being relatively negative electrically at the beginning of step (b).

29. A process as set forth in claim 28 wherein step (d) is carried out in one of a substantial vacuum, helium, argon or hydrogen atmosphere.

30. A process according to claim 29 wherein the thickness of said deposit is from about ½ to about 4 mils.

31. A process as set forth in claim 29 wherein said deposit in (b) is on both of said elements.

32. A process according to claim 28 wherein the thickness of said deposit is from about ½ to about 4 mils.

33. A process as set forth in claim 21 wherein step (d) is carried out in one of a substantial vacuum, helium, argon or hydrogen atmosphere.

34. A process as set forth in claim 1 wherein said heating in step (d) is for a sufficient period whereby the melting temperature at the joint is substantially the same as the elements bonded together.

35. A process as set forth in claim 34 wherein step (d) is carried out in one of a substantial vacuum, helium, argon or hydrogen atmosphere.

36. The process of claim 34 wherein the temperature corresponds to the solution annealing temperature specified for the particular material.

37. A process as set forth in claim 1 wherein step (d) is carried out in one of a substantial vacuum, helium, argon or hydrogen atmosphere.

38. A process according to claim 1 wherein the thickness of said deposit is from about ½ to about 4 mils.

* * * * *